United States Patent [19]
Abrahams et al.

[11] Patent Number: 4,607,196
[45] Date of Patent: Aug. 19, 1986

[54] LAB BOTTLE CAPPER

[75] Inventors: Louis Abrahams, Worcester; Steven P. Carll, Franklin, both of Mass.

[73] Assignee: Zymark Corporation, Hopkinton, Mass.

[21] Appl. No.: 779,211

[22] Filed: Sep. 23, 1985

Related U.S. Application Data

[63] Continuation of Ser. No. 646,445, Aug. 31, 1984, abandoned.

[51] Int. Cl.⁴ .................................................. H02P 1/54
[52] U.S. Cl. ..................................... 318/51; 318/603; 318/432; 318/640; 81/3.2; 81/3.32
[58] Field of Search ...................... 318/51.7, 640, 603, 318/432, 71; 81/3.2, 3.31, 3.32, 3.3 A, 3.4

[56] References Cited

U.S. PATENT DOCUMENTS

| | | | |
|---|---|---|---|
| 3,888,362 | 6/1975 | Fletcher | 318/640 X |
| 4,031,440 | 6/1977 | Christian et al. | 318/432 |
| 4,171,650 | 10/1979 | Cardinal | 81/3.32 |
| 4,289,997 | 9/1981 | Jung et al. | 318/51 X |
| 4,358,970 | 11/1982 | Jacobson | 81/3.2 |
| 4,472,668 | 9/1984 | Mutschler et al. | 318/640 X |

*Primary Examiner*—B. Dobeck
*Attorney, Agent, or Firm*—Andrew F. Kehoe

[57] ABSTRACT

A torque-sensing rotary tool for use in bottle-capping, and other such applications. The tool (10) is characterized by independent motors (30 and 40) means for gripping and rotating bottles or the like and a rotation-counter which forms means, with associated circuitry (FIG. 9), to determine when an object, e.g. a bottle cap, may be safely lifted by automatic machinery, e.g. by robot means.

6 Claims, 10 Drawing Figures

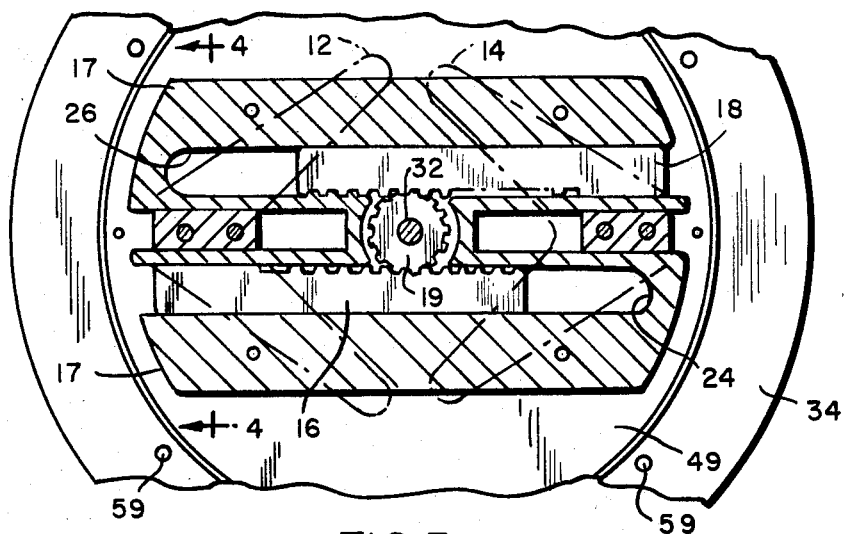
FIG.3
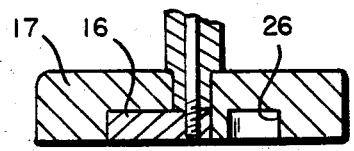
FIG.4
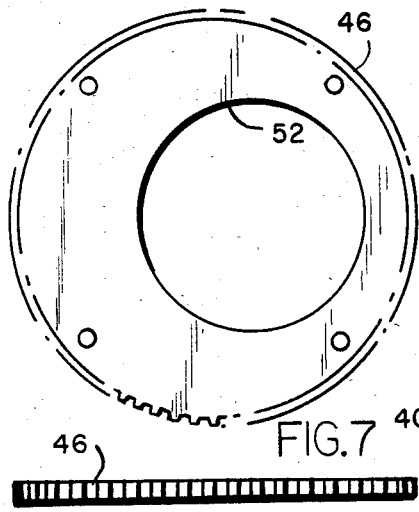
FIG.7
FIG.8
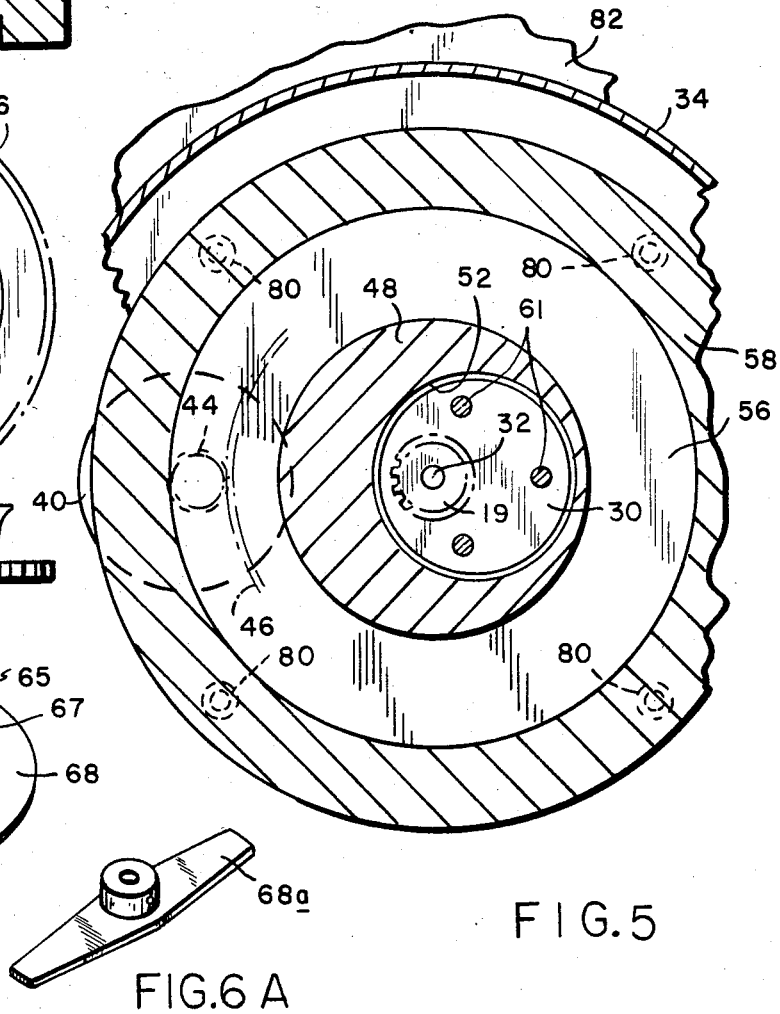
FIG.5
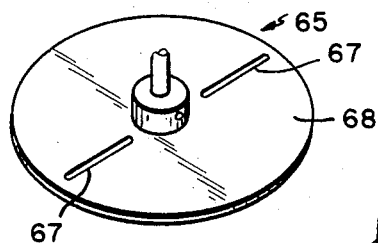
FIG.6
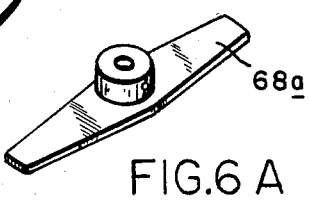
FIG.6A

LAB BOTTLE CAPPER

RELATED APPLICATION

This application is a continuation application of the U.S. Ser. No. 646,445 filed by Abrahams and Carll on Aug. 31, 1984 and entitled "Lab Bottle Capper" now abandoned.

BACKGROUND OF THE INVENTION

This invention relates to apparatus for controllably gripping and rotating apparatus. The invention particularly relates to the controlled closure and opening of screw-cap containers.

A considerable amount of work has been done on equipment for the automatic or remote opening of bottles. A great deal of this art is collected in the United States Patent Office under Art Class 81, subclasses 3.31, 3.32 and 3.33. In general, this art has tended to relate to automatic machinery wherein bottles of the same geometry are manipulated many times. A great deal of work has also been done in developing jar-gripping devices (See for Example, See U.S. Pat. Nos. 2,569,239 and 2,732,740) and other specific apparatus useful in bottle-opening operations.

Despite the earlier work and as will be described in more detail below, the present inventor wished to provide bottle opening apparatus that would be sufficiently versatile and dependable to be generally useful in robotic applications, for example in applications wherein a robot with other duties to perform would also, from time to time, be used in conjunction with the rotary tool of the invention to hold a bottle to be capped, a screw to be inserted into or workpiece, or some other object to be rotated in relation to an object held by the rotary tool.

SUMMARY OF THE INVENTION

It is a principal object of the invention to provide an improved tool for us in controlled relative rotation of articles.

Another object of the invention is to provide an improved bottle capper configured to provide information to associated equipment as in robotic applications.

A further object of the invention is to provide an improved rotating tool for use in screwing and unscrewing one object from another wherein it is desirable to measure the torque, of tightness with which the objects are joined, and/or to measure the number of rotations used in screwing or unscrewing operations.

Other objects of the invention will be obvious to those skilled in the art on reading the subject invention.

The above objects have been substantially achieved by providing apparatus for grasping and holding an object, e.g. a bottle of the type which accepts a screw cap wherein the apparatus has a rotatable gripper assembly. A gripper-operating motor is itself mounted to be rotated, with the gripper assembly, by a second motor which rotates the gripper assembly. A counter assembly, e.g. a photodetector is adapted to serve as a means to count the rotations of either motor and thereby provide a readily-usable control signal for determining the position of the grippers and the number of turns imparted to the gripper assembly during screwing and unscrewing operations. The use of two distinct motors facilitates, also, the use of the amperage from each motor as a distinct signal indicative of the amount of pressure exerted on a bottle during capping, uncapping or gripping and whether or not a stop has been encountered.

Of course, a strain gauge can be used to communicate directly to the motor. Such a gauge could be placed on the gripper means.

In some applications of the invention, it has been found to be desirable to have the apparatus resiliently mounted to accomodate relative motion between a part, e.g. a bottle, being held in the apparatus, and a part, e.g. a screwcap, being placed thereon removed therefrom. Any such resilient mount will do and one, a high-density, open-cell, resilient polyurethane foam pad 90 of about 0.0375-inch in thickness serves as such a mean in the apparatus of FIG. 2.

ILLUSTRATIVE EXAMPLE OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof and will be able to modify it and embody it in a variety of forms, each as may be best suited to the condition of a particular case.

IN THE DRAWINGS

FIG. 3 is a fragmentary plan view, along section line 3:3 of FIG. 2, showing the rotatable gripper assembly.

FIG. 4 is a section taken along line 4:4 of FIG. 3.

FIG. 5 is a plan view, in section, of the apparatus taken along line 5:5 of FIG. 2.

FIG. 6 shows disk counter component useful in the invention.

FIG. 6A shows a preferred, low-inertial counter which provides a means to interrupt light to the detector and allows longer and more dependable service of the gears in the system.

FIG. 7 is a plan view of a the ring gear.

FIG. 8 is an elevation of the ring gear of FIG. 7.

Figure 1:
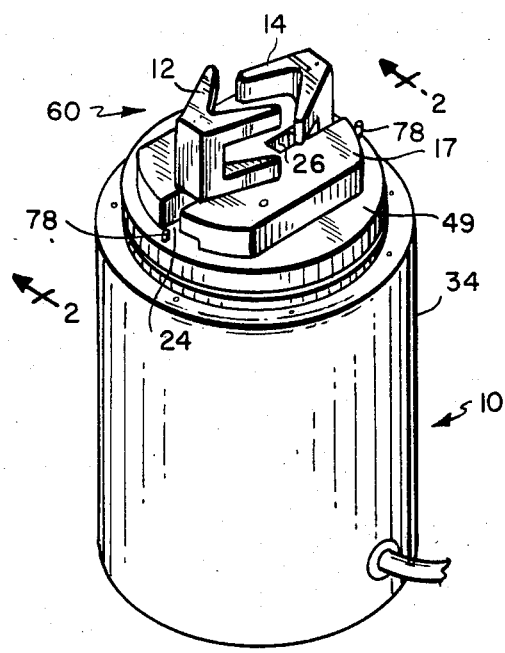
FIG. 1 is a perspective view of a rotational tool of the invention.
Figure 2:
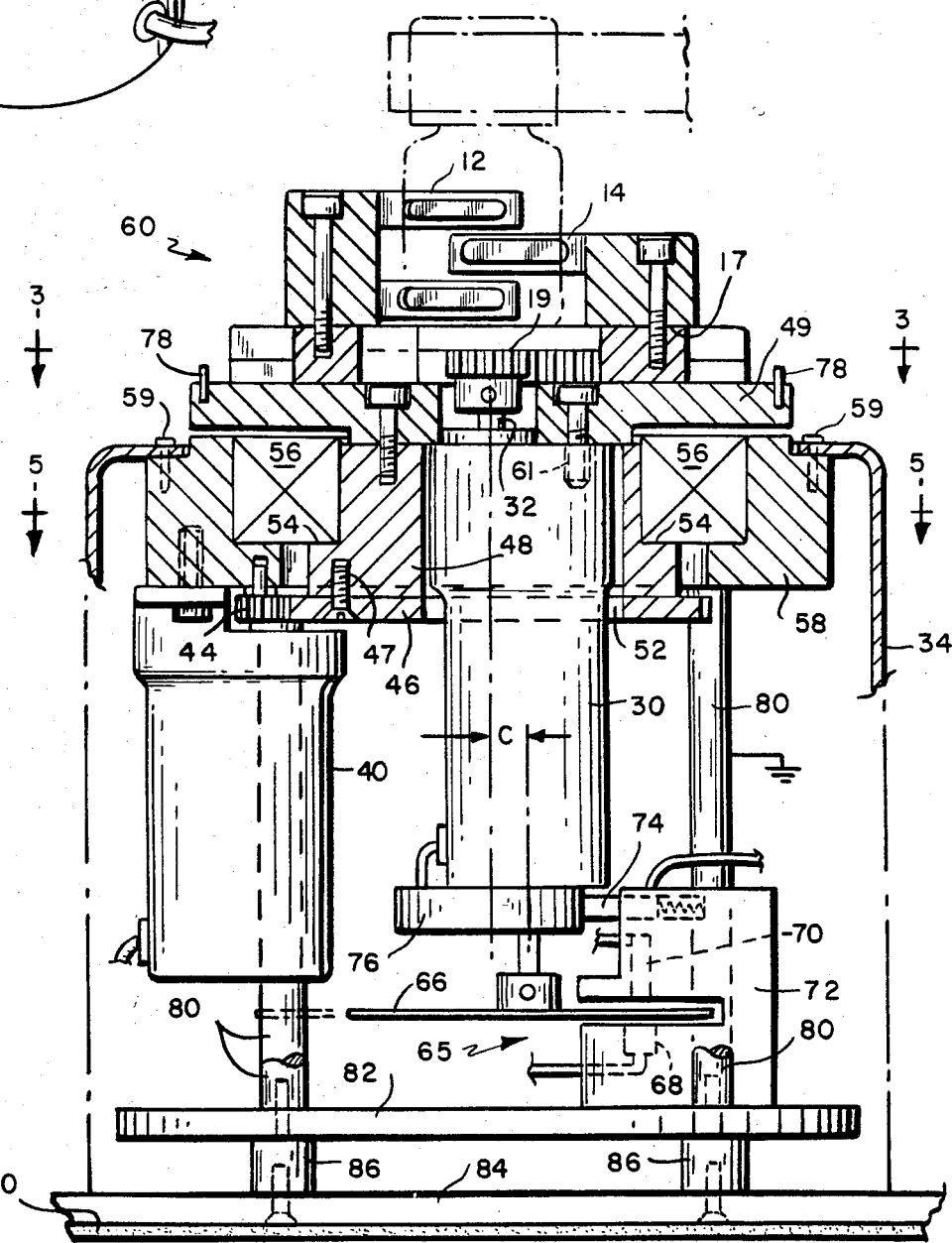
FIG. 2 is a somewhat schematic view in section of apparatus of the invention showing the interior mechanism thereof.

FIG. 1 illustrates a bottle capper 10 constructed according to the invention. The capper comprises two cooperating gripping clamps 12 and 14, each mounted to reciprocate for closing movement towards each other, and opening movement away from each other, on racks 16 and 18, respectively. (Best seen in FIG. 3). Each of racks 16 and 18 are moved to-and-fro within rack housing 17 by a pinion gear 19. Rack housing 17 is configured to accomodate pinion 19 and to provide guide slots 24 and 26 for the racks.

Pinion 19 and, through it, racks 16 and 18 are operated by a centrally-mounted motor 30 which is shown to have an eccentrically-mounted operating shaft 32 and which is mounted beneath the gripping clamps in housing 34. Motor 30 is also attached to turntable 49 of the rotatable-clamp assembly 60 (as by fastener 61).

A second motor 40 serves as a means to rotate the entire assembly 60 on which the clamps, racks, and pinion and keeper brackets are mounted. Motor 30 is also rotated with clamp assembly 60 on central bearing 56.

Motor 40 turns a gear 44 which forms means to turn a ring gear 46. Ring gear 46 is attached by fasteners 47 and bearing boss 48, mounted within bearing 56, so that it turns main turntable 49 of assembly 60. When turntable 49 is rotated, it causes the clamp actuating assembly comprising gripper clamps 12 and 14 and racks 16 and 18 and rack housing 17 and motor 30, to rotate also. It will be understood that if a bottle is held snugly within said clamps as they rotate, it will be "opened" or "closed" with respect to any screw-type bottle cap held in appropriate non-rotating position at the top of the bottle.

Transition ring 48 and ring gear comprise substantial openings, as indicated at 52, to accomodate the motor 30, i.e. the motor which senses the purpose of tightening and loosening the clamps via the above-described rack-and-pinion operating means.

Transition ring 48 also forms a shelf 54, on the outer periphery thereof which shelf provides support means for bearing 56 which facilitates the rotation of the clamp actuating assembly. Bearing 56 is also supported by a stationary bearing support ring 58 mounted by fasteners 59 to housing 34.

The apparatus is supported within housing 34 on support legs 80 which are, in turn supported on a support plate 82 fastened to base plate 84 and bearing boss 58. It is very advantageous for the assembly to be supported on a resilient, vibration absorbing mounting such as is provided by rubber support boots 86 which are attached with fasteners to plate 82 and base plate 84.

As the gripper assembly is opened and closed by motor 30, that motor also operates a counter means, counter assembly 65, comprising a disc reader 66 having two elongate slots 67 therein forming means, with a light source 68 and photodetector 70 to count the number of revolutions of the motor and thereby provide an electrical signal which can be used to establish how far the grippers have been opened or closed. The detector and light source are mounted within a photocell housing 72 through which the slotted portions of disks 66 can rotate. Resiliently mounted on housing 72 is a carbon brush 74 which is adapted to supply power to motor 30 through commutator ring 76 as it rotates.

Not only does the counter assembly 65 monitor the gripping action of the apparatus but it also provides means to count the number of times an object, e.g. a bottle, is turned, e.g. in relation to the bottle cap. It is convenient to program or pre-teach the apparatus the number of rotations of the disk which is to constitute reaching the "fully unscrewed" state of a particular bottle cap designation. Similary, of course, the completion of capping may be sensed by a rise in torque exerted on the bottle.

Figure 9:
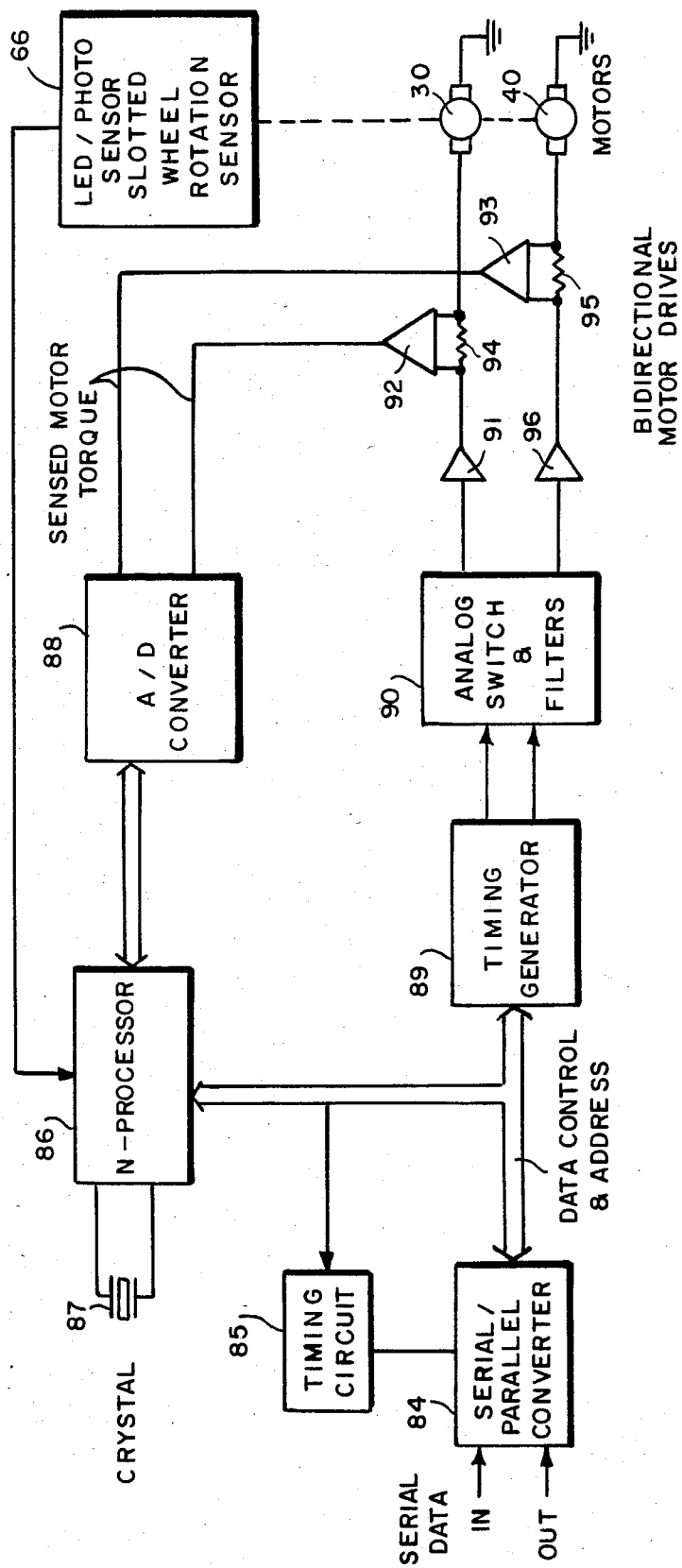
FIG. 9 illustrates a favorable one circuit for useful in the invention.

Referring to FIG. 9, the mechanism is controlled by a microcomputer which includes a microprocessor 86, crystal 87, timing generator 89, analog switch and filtering 90, and motor drives 91 and 96. The microprocessor 86 commands the timing generator 89 to produce a pluse sequence which drives an analog switch and filter 90 to produce a DC signal. This DC signal is amplified by drivers 91 and 96 which are capable of driving motors 30 and 40 in either direction.

The number of rotations due to either motor is feedback to the microprocessor 86. The motors are mechanically linked to an LED/photosensor/slotted wheel 66. As the slot traverses the LED (light emitting diode) to photosensor path, an electrical pulse is generated and input to the microprocessor interrupt line. The interrupt is used for efficiency—the microprocessor need not constantly monitor the rotation sensor 66.

Torque is measured as a voltage drop across resistors 94 and 95. This signal is buffered by amplifiers 92 and 93 and digitized 88 and input to the microprocessor on an input port.

Since the torque and rotation are feedback to the microprocessor, it can control the motors in response to these signals individually (torque or rotation) or in combination (torque and rotation) to slow down, speed up, stop or reverse the motion.

External information is interchanged with the microprocessor by the serial to parallel, input information, and parallel to serial, output information converter 84. Requisite timing is provided by 85. Input information may include: when to begin or stop, limits on torque and rotation; while output information may include: the status of the mechanism, when capping or uncapping is complete, and when any unexpected anomalies occur.

It will be seen that the apparatus described above lends itself to a number of control modes. For example, taking the common situation of screwing and unscrewing a bottle cap of the starting and stopping of the motor functions are readily adapted to be controlled as follows:

When motor 30, the pinion-operating motor, is commanded to clamp a bottle, it may be controlled to proceed from a known or unknown position through a predetermined number of counted turns or until a rise in the torque is sensed in motor 30, e.g. by a rise in amperage to the motor. The degree torque itself may be selected or preprogrammed for a given operation.

When motor 30 is commanded to unclamp a bottle, it may be controlled to proceed through a certain preselected number of turns for a given operation or, e.g. in a situation wherein the object is highly resilient (say a plastic bottle), it may be controlled to start to count rotations from a preselected torque value indicative of a certain pre-loosening action. Likewise, when the gripper assembly has a bottle firmly in hand, motor 40 is adapted to several modes of control of the screwing or unscrewing action. Thus when motor 40 is to be turned in order to turn a bottle to remove a screw cap, it may be controlled turn for a pre-selected counting of turns, or for a number of such turns after a drop in torque is sensed on the motor. When motor 40 is turned to screw a cap on the bottle, the action may be controlled by count or, as is convenient, by sensing the appropriate torque (e.g. at amperage) on the motor.

When torque control is used it is desirable to provide circuit means to neglect any transient increase in motor amperage due only to the starting of the motor.

Another feature of the apparatus relates to the use of stop pins 78 that serve to limit the travel of the racks. These stops serve, when encountered by the racks, as means to cause the amperage drawn by motor 30 to increase rapidly and this increase can, of course, also be used to shut the motor off immediately.

Although some emphasis has been given to bottle/bottle cap manipulator. It is to be understood that the apparatus of the invention could be used with any number of systems calling for both gripping and winding operations. Among such would be attaching pipes with thread-type connections, winding filaments or tapes on bobbins or reels held by the apparatus. Also the apparatus could be used in testing of materials, i.e. gripping a polymeric member with a controlled gripping action and then measuring its physical response to an externally-applied twisting action.

It is also to be understood that the following claims are intended to cover all of the generic and specific features of the invention herein described and all statements of the scope of the invention which might be said to fall therebetween.

What is claimed is:

1. Unwinding apparatus for grasping and holding an object and rotating said object, said apparatus having
    a gripper assembly mounted for rotation on a turntable and comprising gripper means and an actuating means to open and close said gripper means;
    first motor means for rotating said turntable either clockwise or counterclockwise; a second motor means for moving said gripper means, acting through said gripper actuating means, between a closed position and an open position;
    a counter assembly forming means to count the number of revolutions made by each said motor means; and
    electrical motor control circuitry associated with at least one motor to form means to control said one motor in response to the amount of torque or pressure exerted on said object by said gripper actuating means on said turntable.

2. Apparatus as defined in claim 1 wherein said counter assembly includes a rotatable member which serves as means to monitor the number of rotations by one motor and is attached for rotation with motive action of one said motor and is also mounted for rotation as said motor is rotated by another said motor.

3. Apparatus as defined in claim 1 wherein the amperage from each motor is utilized as a signal indicative of pressure exerted on said object.

4. Apparatus as defined in claim 1 wherein said electrical control circuitry associated with at least one motor controls said motor in response to at least one of (a) amperage drawn by said controlled motor or by the number of rotation of said controlled motor noted by said counter assembly.

5. Apparatus as defined in claim 1 wherein said electrical control circuitry comprises a strain guage mounted on said gripper means.

6. Apparatus as defined in claim 1 wherein said gripper means is adapted to hold glass bottles.

* * * * *